Dec. 28, 1965 — R. A. HEMPEL — 3,226,637
DIGITAL CODE RESPONSIVE AUTOMATIC CIRCUIT AND COMPONENT TESTER HAVING CODE SELECTED SERIES CIRCUITS
Filed Feb. 19, 1964 — 3 Sheets-Sheet 1

INVENTOR.
ROY A. HEMPEL
BY McLaughlin & Cahill
ATTORNEYS

Dec. 28, 1965   R. A. HEMPEL   3,226,637
DIGITAL CODE RESPONSIVE AUTOMATIC CIRCUIT
AND COMPONENT TESTER HAVING CODE
Filed Feb. 19, 1964   SELECTED SERIES CIRCUITS
3 Sheets-Sheet 2

INVENTOR.
ROY A. HEMPEL
BY
ATTORNEYS 3,226,637
DIGITAL CODE RESPONSIVE AUTOMATIC CIRCUIT AND COMPONENT TESTER HAVING CODE SELECTED SERIES CIRCUITS
Roy A. Hempel, 4504 N. 16 St., Phoenix, Ariz.
Filed Feb. 19, 1964, Ser. No. 345,959
12 Claims. (Cl. 324—73)

The invention is a continuation-in-part of my application Serial No. 856,116 now abandoned, filed November 30, 1959.

This invention relates to an electrical device for testing electrical circuits and components and more particularly relates to an apparatus for automatically and sequentially selecting and determining whether circuit components such as transistors, controller rectifiers, and elements such as resistors, inductors and capacitors or series, parallel or series-parallel combinations thereof are within a range of acceptable values for use in a particular circuit.

In the manufacture of electrical circuit components, such as transistors, resistors, inductors and capacitors, due to manufacturing inaccuracies, the characteristics of these components may vary within certain allowable manufacturing tolerances from a certain desired, ideal value. It is found that for usual circuit design, use of such components having values within these manufacturing tolerances is entirely satisfactory. In other applications, however, it may become desirable or even imperative that components having values within different and narrower tolerances than manufacturing tolerances, be utilized. These tolerances, of course, may differ widely according to the character and function of the circuit and the character and function of the particular component under consideration.

Accordingly, it is necessary in assembling electrical or electronic circuits to select and utilize components which, for the circuit under consideration, have values within a predetermined acceptable range of deviation from an ideal value or in some cases to make such a determination after assembly of the circuit and further to determine potentials at nodal points of the circuit to further test the propriety and acceptability of the components. It is, of course, expedient and economical to make such determinations and selections quickly and easily by an apparatus operable even by a relatively inexperienced lay person. As an example, the successive testing of electrical, electronic or other circuits, completed or partially completed and passing along a production assembly line is frequently necessary.

It is therefore a primary object of this invention to facilitate the quick, effective and orderly selection and testing of electrical circuit components, either individually or in combination with other circuit components for determining the deviation from acceptable values of their resistance, inductance or capacitance or determining the deviation from acceptable value of nodal potentials in an electrical or electronic circuit comprising the several components.

Pursuant to this foregoing object and in accordance with this invention, each component, combination thereof or nodal potential of the plurality to be tested is automatically and sequentially connectable in series with a standard precision resistor of known value and a potential source of predetermined magnitude and the potential drop across the standard precision resistor is automatically examined to determine whether it varies beyond predetermined acceptable values. A variance of such potential beyond such an acceptable value is an indication of variance in value of the component, components or potential to be tested, the standard precision resistor, the magnitude of the applied direct or alternating potential, the frequency of the alternating potential and other associated apparatus such as the potential examining and indicator apparatus are automatically accomplished by the selective actuation of appropriate combinations of relays having contacts interposed in various lines. Further in accordance with this invention, the actuation of these relays is controlled by a precoded recorder having thereon complete information concerning the testing of each component, combination of components or potential and automatically and simultaneously actuating the combination of relays necessary for any one test. Such a recorder may be of several types, such as a circular disc composed of a medium such as paper, film or the like, having a series of enclosures or "blocks" along sectors thereof, each sector being precoded with a binary coded word. The blocks may either absorb or reflect light impinging thereon to activate or fail to activate a photoelectric cell on the same side of the recorder as the light source. The photoelectric cells in turn activate certain combinations of relays to appropriately connect the component under test and other associated elements into circuit to automatically make the necessary determinations.

It is another object of this invention to facilitate the automatic programming of relays in accordance with the occurrence or non-occurrence of an event. Any sector of the recorder above mentioned may be coded to accomplish the closure of suitable relays to energize or deenergize other external circuit components such as motors, relays, relay armature coils and the like and to do so in response to the occurrence of some event such as the testing of an acceptable or non-acceptable circuit component.

Other and further objects and advantages will appear from a perusal of the following detailed description of the invention considered in conjunction with the accompanying drawings in which.

Figure 1:
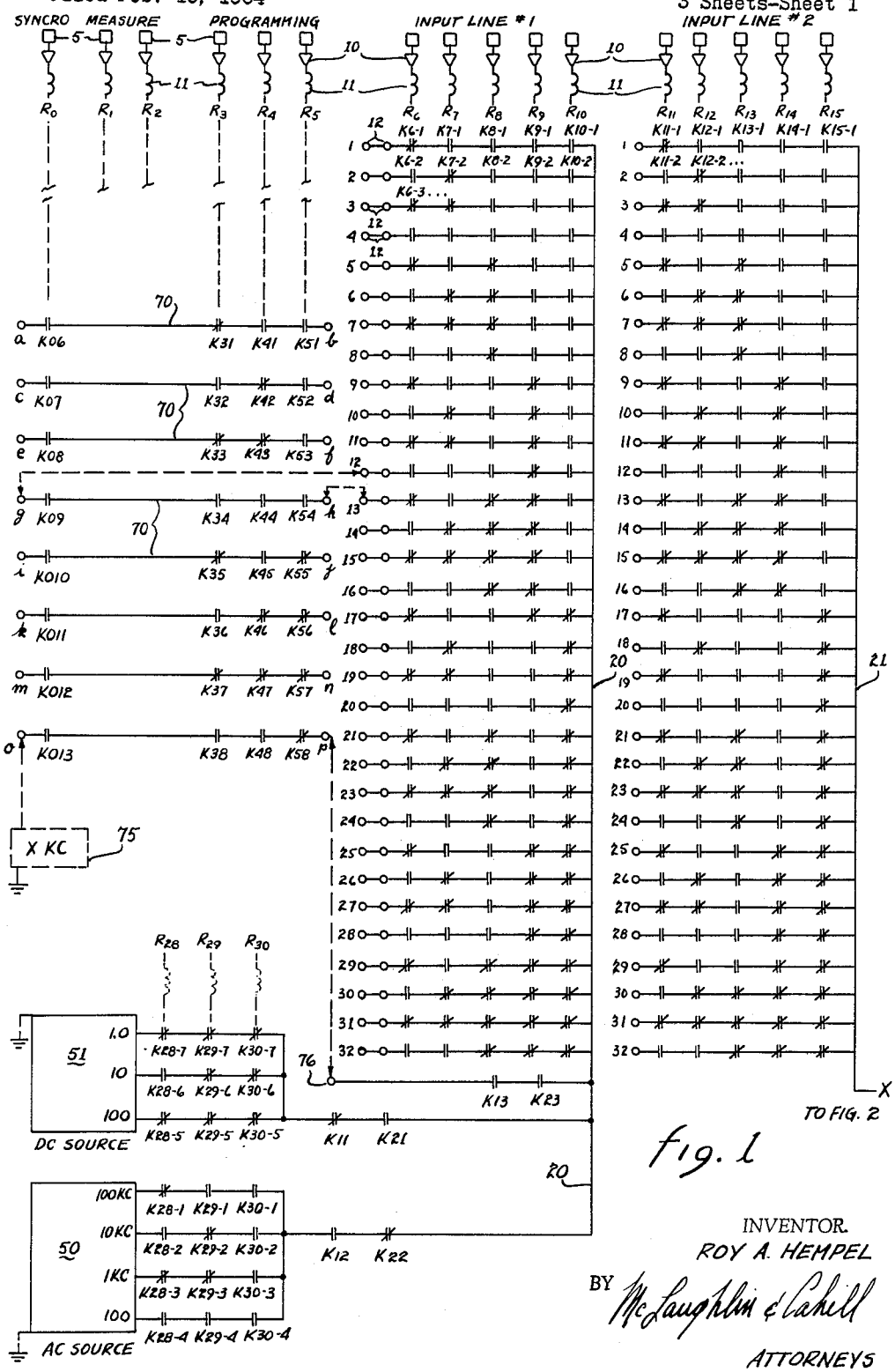
FIG. 1 is a schematic circuit diagram of a portion of an automatic component tester constructed in accordance with the teachings of the present invention.
Figure 2:
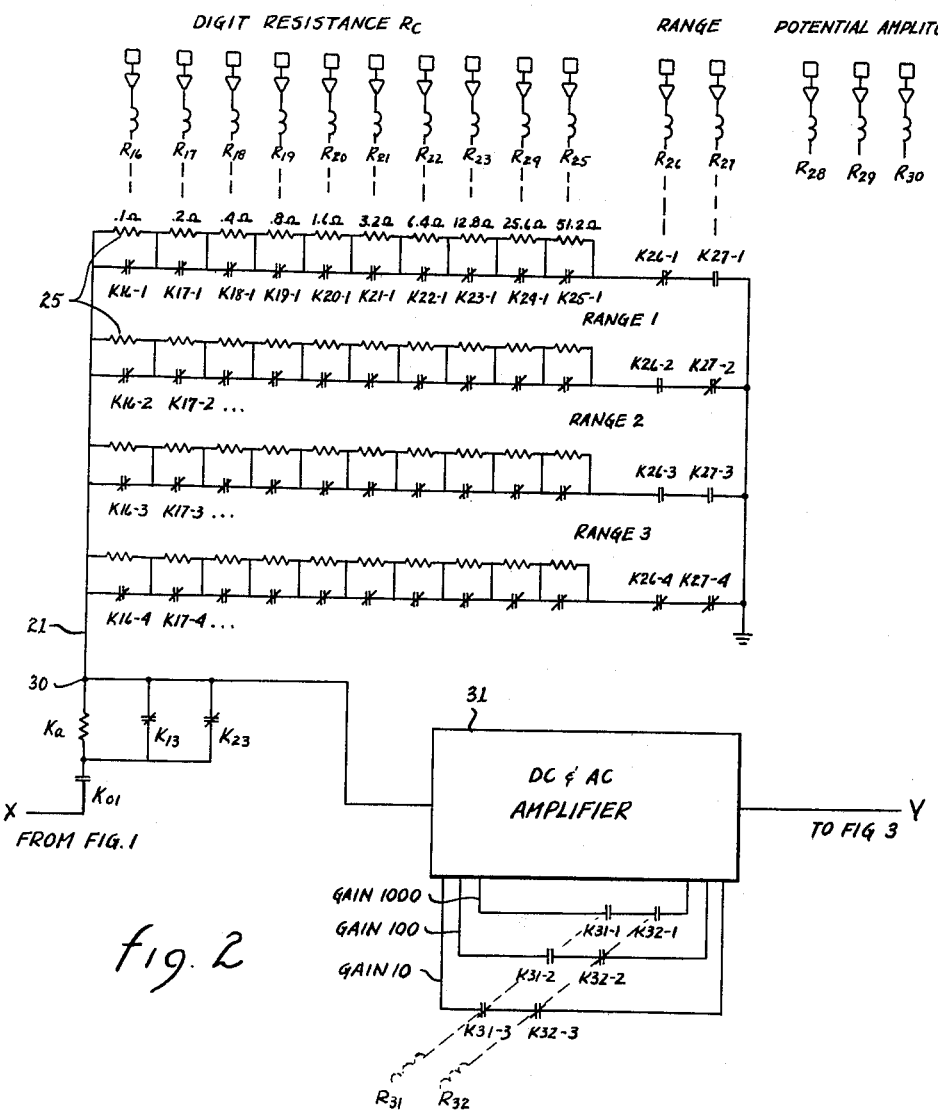
FIG. 2 is a continuation of the schematic circuit diagram of FIG. 1.
Figure 3:
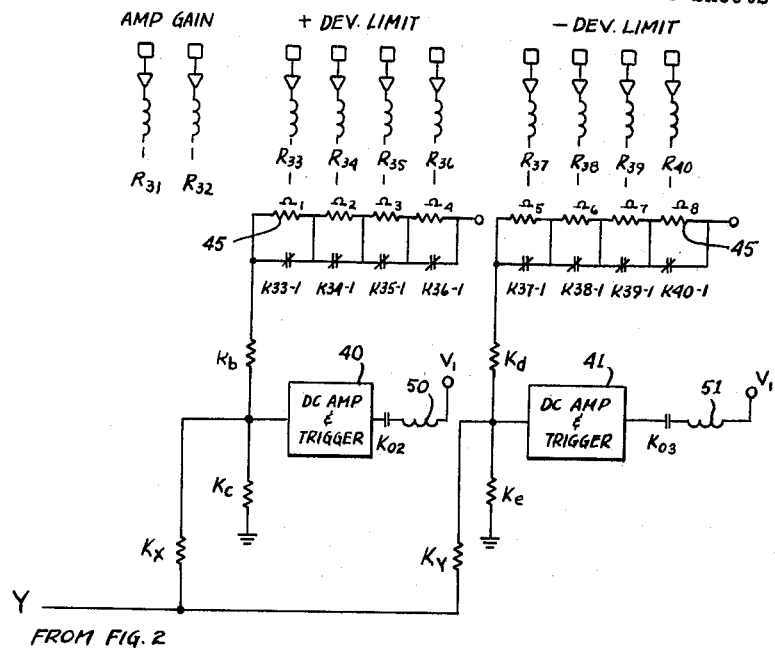
FIG. 3 is a continuation of the schematic circuit diagram of FIG. 2.

Referring to FIGS. 1, 2 and 3, the utilization of a binary coded word for the implementation of programmed testing is achieved by the present invention through a series of sensing devices 5. The sensing devices, in a typical application, may be photoelectric or photosensitive devices responsive to the presence or absence of a certain light level transmitted through or reflected from a recording medium. Each of the sensing devices includes an amplifying 10 device of well-known design for appropriately amplifying the signal derived by the detection of a binary bit and for application of the amplified signal to a relay coil 11. The sensing devices are grouped into inter-related functional groups, each group of which accomplishes a specified task in the selection and testing of appropriate circuit paths in a connected circuit to be tested. The electronic components arranged in the usual form on a circuit board, or integrated circuits in monolithic form may be connected to the circuit tester of the present invention by plugging the appropriate prongs of the device or circuit into sockets 12 in the circuit tester. Under certain circumstances, it may be beneficial to utilize an adaptor for receiving the terminals of the circuit to be tested and for connecting these terminals to the sockets of the circuit tester.

Each sensing device 5, amplifier 10 and relay coil 11 is chosen to be responsive to a pre-determined bit of the binary coded word presented by the program storage device. Each sensing device, amplifier, and relay coil may be termed a channel, and groups of sensing devices correspond to channel groups. The channels have been designated in the accompanying drawings as channels R0 through R40. The relay coil of each channel opens or closes relay contacts which are conveniently identified in the drawings by the letter "K" followed by a number corresponding to the coil actuating the contacts, and finally by a number designating the specific contacts. A specific channel is reserved as a synchronizing channel R0, the relay coil of which operates a plurality of relay contacts K01 through K013, all of which are normally open, and which inhibit the operation of the remainder of the circuit tester until the synchronizing channel is actuated by the detection of an appropriate binary bit at the specified location within the binary coded word. The synchronizing channel becomes increasingly important as the functions for which the tester is to be used increase; that is, when a great number of selections are to be made in regard to testing level, appropriate deviation limit, type of potential source, etc., the variety of information presented to all of the sensing devices and to all of the channels should be presented simultaneously so that the corresponding relay coils will be energized or de-energized in accordance with the information content of the binary coded word. Since the recording medium for storing the binary coded word will rarely be of the type that will present the 41 binary bits of the binary coded word simultaneously to the respective channels, the asynchronous nature of the medium can be remedied through the utilization of the synchronizing channel which will be energized only during a brief period of time, during which time the remainder of the channels will either have a bit, or an absence of a bit, presented to it in the corresponding bit position of the binary coded word. The synchronizing channel is designated as R0 and is the first channel of 41 channels provided in the circuit tester of the present invention.

The circuit tester of the present invention includes an A.C. potential source as well as a D.C. potential source for application to the circuit under test. It is quite frequently necessary to impose a potential across the circuit under test that is not available within the circuit tester itself; therefore, it is incumbent to provide a means for connecting an external source into the system to be applied across the selected terminals of the circuit. Channels R1 and R2 are provided for coding the appropriate type of potential to be impressed upon the circuit under test.

An inspection of the relay contact pairs K13–K23, K11–K21, and K12–K22 reveals that the circuits connected in series with the relay contact pairs are always open unless certain combinations of the channels R1 and R2 are energized. For example, a binary coding in the second and third positions of the binary coded word (the binary bits presented to the sensing devices of channels R1 and R2) of "11" will energize both of the coils 11 of channels R1 and R2 thus closing all normally open relays and opening all normally closed relays operated by the coils. In this example, relay contacts K13 and K23 will be both be closed thus connecting the external source into the system; whereas, contact K11 will be opened to prevent the D.C. source from being connected into the system and contact K22 will be opened to prevent the A.C. source from being connected into the system.

Channels R3, R4 and R5 are programming channels and provide versatility heretofore unattainable by prior-art circuit testing devices. The programming channels will be discussed more fully hereinafter.

Channels R6 through R10 are grouped into what is designated as input line No. 1. The five channels are utilized to detect five bits of the binary coded word and which are used, through the operation of the corresponding relay coils, to open or close relay contacts, and complete any one of $2^5$ (or 32) series circuits. Each of these series circuits (numbered 1 through 32 in the drawings) is connected between an input terminal 12 or socket, to which an external circuit under test may be connected, and a line 20 connecting the respective series circuit to a potential source. An inspection of the input line No. 1, or channels R6 through R10, indicates that appropriate coding of the five bits involved will operate the corresponding relays so that one of the 32 series circuits is closed and the remainder of the series circuits remain open. For example, a binary input code to the channels R6 through R10 of "11100" would energize the relay coils of channels R6, R7 and R8 while leaving the relay coils of channels R9 and R10 unenergized. The input code would therefore complete the series circuit No. 28 and would establish a circuit from a potential source, through conductor 20, through the series circuit No. 28 and thence to the external circuit connected thereto.

The next five channels R11 through R15 are grouped into an input line No. 2. Similar to input line No. 1, input line No. 2 is utilized to detect the next five bits of the binary coded word to subsequently operate corresponding contacts and to close one of 32 series circuits. One side of each of the series circuits of input line No. 2 is connected to a terminal 12 or socket in a manner similar to input line No. 1, and the opposite side of each of the series circuits is connected, through conductor 21, to the measurement portion of the system of the present invention to be described more fully hereinafter. For example, if the five bit code "11001" was presented to the five channels comprising input line No. 2, the series circuit 16 would be completed and a circuit would be established between terminal 12 of series circuit 16 (and the external circuit connected thereto) and the conductor 21. Extending the above examples into a single example pertaining to both input lines, it may be seen then with a coding presented to input channels R6 through R15 of 1110011001, a potential would be placed across any external circuit connected between input line No. 1 series circuit 28 and input line No. 2 series circuit 16.

Input line No. 2 is connected, through conductor 21, to a plurality of precision resistors 25 connected in parallel-series arrangements, each having a shunting relay contact thereacross. Channels R16 through R25 are used to shunt the respective precision resistors to enable the appropriate selection of the precise resistance value to be placed in the circuit with input line No. 2. The respective series connection of precision resistors are parallelled with each other and each contain contacts from channels R26 and R27. Therefore, it may be seen that any one of the parallel-connected precision resistors series circuits may be connected into the circuit with input line No. 2 by closing the appropriate relay contacts K26 and K27. The precise value of the series resistance is determined by the number of relay contacts that are closed thus shunting the corresponding portion of the precision resistor series circuits. Channels R26 and R27 may thus be designated as range channels since the binary information contained in the two bit positions detected by R26 and R27 determine which of the series precision resistor circuits will be utilized in the measurement of the circuit under test. Thus a binary input to channels R26 and R27 of "01" will energize the relay coil of R27 to close the contacts K27–1 and K27–3 while opening the contacts K27–2 and K27–4. The relay coil of channel R26 will not be energized and the normally closed contacts of that channel (K26–1 and K26–4) will remain closed while the normally open contacts (K26–2 and K26–3) will remain open. Accordingly, it may be seen that the uppermost series precision resistor circuit will be connected to input line 2 via conductor 21. Extending this example further to include channels R16–R27, a binary input of "111000000001" will connect the uppermost series precision resistor circuit to the input line 2, and will energize relay coils of channels R16, R17 and R18 thus opening the normally closed contacts K16–1, K17–1, and K18–1 to thus insert the corresponding resistors having a total resistance value of 0.7 ohms.

The potential drop developed across the respective precision resistors is detected at node 30 and applied to an A.C.-D.C. amplifier 31 which has a variable gain. The amplifier design is conventional and may be one of several presently-available designs readily available on the market. The gain of the amplifier is determined by the "open" or "closed" position of the respective relay contacts of channels R31 and R32. In the embodiment chosen for illustration, the amplifier may have gains of unity, 10, 100 and 1,000; the information contained in the binary positions presented to channels R31 and R32 determines the amplifier gain which may be unity (binary code 01), 10 (binary code 00), 100 (binary code 10) or 1,000 (binary code 11). The output of the A.C.-D.C. amplifier is applied to amplifier and trigger circuits 40 and 41 for determination of the acceptability of the voltage level. Series resistors $R_x$ and $R_y$ respectively are inserted in series with the input of amplifier and trigger circuits 40 and 41. Voltage dividing resistors $R_b$ and $R_c$ are also connected to the input of amplifier trigger 40 for setting the level at which the corresponding amplifier trigger will provide an output signal. Similarly, the second amplifier trigger 41 is also provided with an input resistance voltage divider network of $R_d$ and $R_e$ for the same purpose. The triggering voltage levels may be varied by inserting series resistances 45 in the potential divider at the amplifier-trigger input. Accordingly, channels R33 through R36 may be designated as positive deviation limit channels, each of which operates relay contacts shunting a corresponding resistance that is connected in series with the voltage divider resistors $R_b$ and $R_c$ at the amplifier-trigger input. Channels R37 through R40 may be designated negative deviation limit channels since they provide a means for shunting corresponding series resistors connected in series with the voltage divider resistors $R_d$ and $R_e$ at the input to the second amplifier-trigger 41. An output signal presented by either of the amplifier-triggers may be used to generate an alarm or other indicator, such as through the utilization of relay coils 50 and 51, to thereby yield an indication that the predetermined positive deviation limit or negative deviation limit has been exceeded by that portion of the circuit presently under test.

Channels R28 through R30 are designated potential amplitude channels since the relay contacts K28, K29 and K30 energized by the corresponding relay coils are inserted in series circuits between the corresponding A.C. source 50 or D.C. source 51 and input line No. 1. The value of the amplitude of the potential applied to the circuit under test may thus be chosen in accordance with the three bit portion of the binary word presented to the sensing devices of channels R28, R29 and R30. For example, assuming that the internal D.C. source 51 is to be utilized as the potential source, a binary code presented to channels R28 through R30 of "100" would close relay contact K28–6 and open relay contacts K28–7 and K28–5 thus leaving only the middle relay circuit completed to provide the medium D.C. potential source (10 volts in the embodiment chosen for illustration) to input line No. 1.

Figure 4:
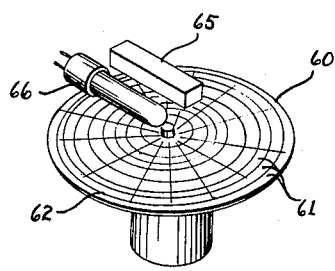
FIG. 4 is a schematic illustration of a means for storing and retrieving binary coded information for programming the tester of the present invention.
Figure 5:
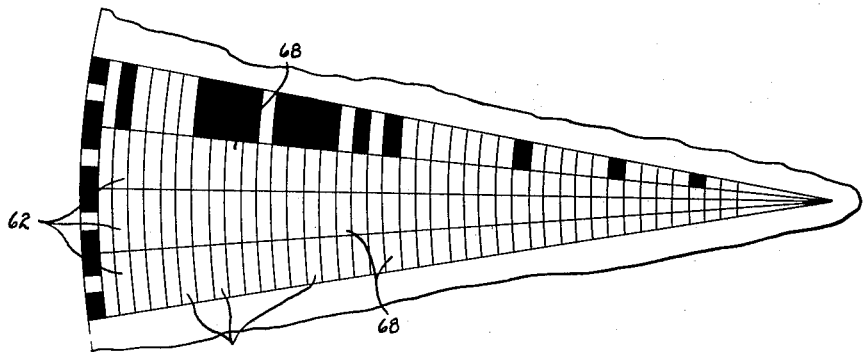
FIG. 5 is an enlarged view of a portion of FIG. 4.

The medium upon which the binary coded word may be stored may take the form of a disk as shown in FIGURES 4 and 5. Referring to these figures, it may be seen that the disk 60 is divided into a plurality of channels 61 (each channel represented by a concentric ring) and is further divided into sectors 62, each sector containing one binary coded word. The sensing devices corresponding to channels R0 through R40 may take the form of photoelectric devices 65 responsive to light reflected from the disk and originating at a lamp 66 mounted in proximity to the photoelectric devices. Accordingly, each bit position of the binary coded word corresponds to a small block 68 on the disk formed by the concentric rings divided by the radial lines separating the sectors Each of these blocks will contain one bit of information and may be coded so that if the block has been blackened or rendered non-reflective, the absence of a binary bit will be implied (a binary zero). If the particular block has not been blackened, the light reflected from the block to the corresponding photoelectric device will be interpreted as a binary 1. It may be noted that the outermost channel on the disk is provided with pre-encoded binary ones and is used as the synchronizing channel corresponding to channel R0 in the system of the present invention. The advantages of the synchronizing channel may now become apparent in that it may be seen that the blackened areas in the respective blocks provided for each binary bit may not be perfectly aligned or perfectly filled so that the binary information transferred to the sensing devices of the system will not necessarily appear to the sensing devices simultaneously; therefore, some of the relays operated by relay coils of the sensing devices will be operated prematurely, or may continue to be operated after their operation should cease. Accordingly, the synchronizing channel is energized for a brief period of time, during which time the binary information contained in the binary coded word may be presented simultaneously to all of the sensing devices. The utilization of a disk for the storage of the binary information has several advantages not the least of which is the ability to add the binary information to the disk by pencil and the use of ordinary phonograph equipment for driving the disk. The circuit testing system of the present invention may thus readily be rendered portable, and may be used as indicated above merely by blackening the appropriate block on the disk to correspond to the binary coded input information.

Returning now to the programming channels R3, R4 and R5, the versatility of the circuit testing system of the present invention is greatly enhanced through the provision of a plurality of programming circuits, each comprising a series circuit 70 including relay contacts from each of the programming channels R3, R4 and R5 and relay contacts from the synchronizing channel R0. The series circuits are terminated at either end thereof by terminals a, b, c, d, . . . that may be connected to the input lines or to an external source of potential, resistances, or other electrical devices desired to be inserted into the testing system. For example, assuming that it would be desirable to program the short-circuiting of series circuits 12 and 13 of input line No. 1 (such short-circuiting may very well be desirable when it is desired to test an external circuit first as it appears with series circuits 12 and 13 open and second as it would appear with the two series circuits short-circuited) the programming circuit including relays K34, K44 and K54, and relay K04, is connected between the terminals of series circuits 12 and 13 of the input line No. 1 as indicated by dashed lines in FIG. 1. Thus, when an external circuit to be tested is connected into the input line No. 1 terminals, the circuit may be programmed to test in any desired manner the electrical characteristics existing between any desired input line No. 1 terminals and input line No. 2 terminals; subsequently, upon presenting a binary input of "111" to the programming channels R3, R4 and R5, the same electrical tests may be conducted upon the external circuit with the terminals of series circuits 12 and 13 short-circuited to thereby present a different set of electrical quantities to the circuit testing system. Similarly, in those instances where an A.C. source is to be used, and the frequency thereof is not a frequency contained in the A.C. source 50 internal to the circuit testing system, an external A.C. source 75 (FIG. 1) of the appropriate frequency may be connected to terminal "o" of the programming circuits and terminal "p" may be connected to terminal 76. Thus, when the binary information presented to programming channels R3, R4 and R5 is the binary quantity "110," the external A.C. source 75 will be connected through the programming circuit to terminal 76. If the channels R1 and R2 are presented with the binary code "11," then contacts K13 and K23 will close and the external A.C. source 75 will be connected from terminal 76 to input line No. 1 via conductor 20. It may readily be seen that a plurality of input potentials may be connected to the respective programming circuits, and subsequent successive tests may be made upon the external circuit by merely programming channel R3, R4 and R5 to successively connect the corresponding A.C. sources to the input line No. 1. This type of testing is particularly useful where it is necessary to determine the appropriate frequency response of a circuit under test; for example, in many instances a particular circuit may have to operate within a range of frequencies, and the characteristics exhibited by the circuit at the different frequencies must fall within pre-determined limits. Accordingly, a plurality of A.C. sources, each with a unique frequency, may be connected to one of the programming circuits, and through the programming channels may be programmed to be applied to the external circuit under test, while the effects of the different frequencies may be programmed into the remainder of the circuit testing system, and the acceptability of the corresponding circuit determined for each of the chosen frequencies. This same type of test may be repeated with chosen input terminals short-circuited as described previously in connection with terminals 12 and 13.

It may therefore be seen that the versatility afforded by the programming channels of the present invention, in connection with the remainder of the circuit testing system, yields capabilities far exceeding those provided by present circuit testing systems, and enables the capacity of the system to be expanded. Further, the utilization of a simple disk having unique blocks arranged for blackening enables the use of simple and inexpensive equipment for inserting the binary coded information into the system to determine the parameters to be used in testing an electrical circuit.

It will be obvious to those skilled in the art that many modifications may be made in the present invention without departing from the scope thereof. For example, the disk may readily be formed to enable the information to be placed thereon by punching holes in the corresponding blocks rather than blackening the blocks to thereby permit the passage of light to photoelectric devices located on the opposite side of the disk from the source of light. It is therefore intended that the present invention be limited only by the scope of the claims appended hereto.

I claim:
1. In an automatic component tester:
  (a) a plurality of channels, each comprising:
    (1) a sensing device responsive to a single bit of a binary coded word for generating a signal in response to said bit,
    (2) a relay coil,
    (3) amplifying means connecting said sensing device to said relay coil for amplifying said signal and energizing said relay coil,
    (4) a group of relay contacts for opening and closing electrical circuits in response to the energization of said relay coil,
  (b) one of said channels being a synchronizing channel the relay contacts of which are normally open and which inhibit the operation of the automatic component tester until said normally open relay contacts are closed,
  (c) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
  (d) means for connecting circuits and components to be tested between said two groups of input channels.

2. In an automatic component tester:
  (a) a plurality of channels, each comprising:
    (1) a sensing device responsive to a single bit of a binary coded word for generating a signal in response to said bit,
    (2) a relay coil,
    (3) amplifying means connecting said sensing device to said relay coil for amplifying said signal and energizing said relay coil,
    (4) a group of relay contacts for opening and closing electrcal circuits in response to the energization of said relay coil,
  (b) one of said channels being a synchronizing channel the relay contacts of which are normally open and which inhibit the operation of the automatic component tester until said normally open relay contacts are closed,
  (c) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
  (d) means for connecting circuits and components to be tested between said two groups of input channels,
  (e) a potential source connected, through the relays of a second predetermined number of channels of said plurality of channels, in series with the series circuits of said first group of input channels.

3. In an automatic component tester:
  (a) a plurality of channels, each comprising:
    (1) a sensing device responsive to a single bit of a binary coded word for generating a signal in response to said bit,
    (2) a relay coil,
    (3) amplifying means connecting said sensing device to said relay coil for amplifying said signal and energizing said relay coil,
    (4) a group of relay contacts for opening and closing electrical circuits in response to the energization of said relay coil,
  (b) one of said channels being a synchronizing channel the relay contacts of which are normally open and which inhibit the operation of the automatic component tester until said normally open relay contacts are closed,
  (c) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
  (d) means for connecting circuits and components to be tested between said two groups of input channels,
  (e) a potential source connected, through the relays of a second predetermined number of channels of said plurality of channels in series with the series circuits of said first group of input channels, (f) a third predetermined number of channels of said plurality of channels being programming channels,
(g) a plurality of programming circuits each comprising a series circuit including:
    (1) relay contacts from each of said programming channels,
    (2) relay contacts from said synchronizing channel,
    (3) the relay contacts from each of said programming channels being a mixture of normally open and normally closed contacts, said mixture being unique for each programming circuit,
(h) means for connecting said programming circuits to predetermined series circuits of said groups of input channels.

4. In an automatic component tester:
(a) a plurality of channels, each comprising:
    (1) a sensing device responsive to a single bit of a binary coded word for generating a signal in response to said bit,
    (2) a relay coil,
    (3) amplifying means connecting said sensing device to said relay coil for amplifying said signal and energizing said relay coil,
    (4) a group of relay contacts for opening and closing electrical circuits in response to the energization of said relay coil,
(b) one of said channels being a synchronizing channel the relay contacts of which are normally open and which inhibit the operation of the automatic component tester until said normally open relay contacts are closed,
(c) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
(d) means for connecting circuits and components to be tested between said two groups of input channels,
(e) a potential source connected, through the relays of a second predetermined number of channels of said plurality of channels in series with the series circuits of said first group of input channels,
(f) a third predetermined number of channels of said plurality of channels the relays of which selectively shunt series-connected precision resistors,
(g) means connecting said resistors in series with the series circuits of said second group of input channels.

5. In an automatic component tester:
(a) a plurality of channels, each comprising:
    (1) a sensing device responsive to a single bit of a binary coded word for generating a signal in response to said bit,
    (2) a relay coil,
    (3) amplifying means connecting said sensing device to said relay coil for amplifying said signal and energizing said relay coil,
    (4) a group of relay contacts for opening and closing electrical circuits in response to the energization of said relay coil,
(b) one of said channels being a synchronizing channel the relay contacts of which are normally open and which inhibit the operation of the automatic component tester until said normally open relay contacts are closed,
(c) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
(d) means for connecting circuits and components to be tested between said two groups of input channels,
(e) a potential source connected, through the relays of a second predetermined number of channels of said plurality of channels in series with the series circuits of said first group of input channels,
(f) a third predetermined number of channels of said plurality of channels the relays of which selectively shunt series-connected precision resistors,
(g) means connecting said resistors in series with the series circuits of said second group of input channels,
(h) a fourth predetermined number of channels of said plurality of channels being programming channels,
(i) a plurality of programming circuits each comprising a series circuit including:
    (1) relay contacts from each of said programming channels,
    (2) relay contacts from said synchronizing channels,
    (3) the relay contacts from each of said programming channels being a mixture of normally open and normally closed contacts, said mixture being unique for each programming circuit,
(j) means for connecting said programming circuits to predetermined series circuits of said groups of input channels.

6. In an automatic component tester:
(a) a plurality of channels, each comprising:
    (1) a sensing device responsive to a single bit of a binary coded word for generating a signal in response to said bit,
    (2) a relay coil,
    (3) amplifying means connecting said sensing device to said relay coil for amplifying said signal and energizing said relay coil,
    (4) a group of relay contacts for opening and closing electrical circuits in response to the energization of said relay coil,
(b) one of said channels being a synchronizing channel the relay contacts of which are normally open and which inhibit the operation of the automatic component tester until said normally open relay contacts are closed,
(c) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
(d) means for connecting circuits and components to be tested between said two groups of input channels,
(e) a potential source connected, through the relays of a second predetermined number of channels of said plurality of channels in series with the series circuits of said first group of input channels,
(f) a third predetermined number of channels of said plurality of channels the relays of which selectively shunt series-connected precision resistors,
(g) means connecting said resistors in series with the series circuits of said second group of input channels,
(h) amplifying means connected to said precision resistors,
(i) detector means connected to said amplifying means for generating an indicator signal when the output of said amplifying means deviates beyond predetermined limits.

7. In an automatic component tester:
(a) a plurality of channels, each comprising:
  (1) a sensing device responsive to a single bit of a binary coded word for generating a signal in response to said bit,
  (2) a relay coil,
  (3) amplifying means connecting said sensing device to said relay coil for amplifying said signal and energizing said relay coil,
  (4) a group of relay contacts for opening and closing electrical circuits in response to the energization of said relay coil,
(b) one of said channels being a synchronizing channel the relay contacts of which are normally open and which inhibit the operation of the automatic component tester until said normally open relay contacts are closed,
(c) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
(d) means for connecting circuits and components to be tested between said two groups of input channels,
(e) a potential source connected, through the relays of a second predetermined number of channels of said plurality of channels in series with the series circuits of said first group of input channels,
(f) a third predetermined number of channels of said plurality of channels the relays of which selectively shunt series-connected precision resistors,
(g) means connecting said resistors in series with the series circuits of said second group of input channels,
(h) a fourth predetermined number of channels of said plurality of channels being programming channels,
(i) a plurality of programming circuits each comprising a series circuit including:
  (1) relay contacts from each of said programming channels,
  (2) relay contacts from said synchronizing channel,
  (3) the relay contacts from each of said programming channels being a mixture of normally open and normally closed contacts, said mixture being unique for each programming circuit,
(j) means for connecting said programming circuits to predetermined series circuits of said groups of input channels,
(k) amplifying means connected to said precision resistors,
(l) detector means connected to said amplifying means for generating an indicator signal when the output of said amplifying means deviates beyond predetermined limits.

8. In an automatic component tester:
(a) a disc having a plurality of sectors, each sector containing a binary coded word, each bit of said binary coded word positioned within a discrete block on said disc,
(b) a plurality of channels, each comprising:
  (1) a sensing device responsive to a single bit of a binary coded word for generating a signal in response to said bit,
  (2) a relay coil,
  (3) amplifying means connecting said sensing device to said relay coil for amplifying said signal and energizing said relay coil,
  (4) a group of relay contacts for opening and closing electrical circuits in response to the energization of said relay coil,
(c) one of said channels being a synchronizing channel the relay contacts of which are normally open and which inhibit the operation of the automatic component tester until said normally open relay contacts are closed,
(d) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
(e) means for connecting circuits and components to be tested between said two groups of input channels,
(f) a potential source connected, through the relays of a second predetermined number of channels of said plurality of channels, in series with the series circuits of said first group of input channels.

9. In an automatic component tester:
(a) a disc having a plurality of sectors, each sector containing a binary coded word, each bit of such binary coded word positioned within a discrete block on said disc,
(b) a plurality of channels, each comprising:
  (1) a sensing device responsive to a single bit of a binary coded word for generating a signal in response to said bit,
  (2) a relay coil,
  (3) amplifying means connecting said sensing device to said relay coil for amplifying said signal and energizing said relay coil,
  (4) a group of relay contacts for opening and closing electrical circuits in response to the energization of said relay coil,
(c) one of said channels being a synchronizing channel the relay contacts of which are normally open and which inhibit the operation of the automatic component tester until said normally open relay contacts are closed,
(d) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
(e) means for connecting circuits and components to be tested between said two groups of input channels,
(f) a potential source connected, through the relays of a second predetermined number of channels of said plurality of channels in series with the series circuits of said first group of input channels,
(g) a third predetermined number of channels of said plurality of channels the relays of which selectively shunt series-connected precision resistors,
(h) means connecting said resistors in series with the series circuits of said second group of input channels,
(i) a fourth predetermined number of channels of said plurality of channels being programming channels, (j) a plurality of programming circuits each comprising a series circuit including:
(1) relay contacts from each of said programming channels,
(2) relay contacts from said synchronizing channel,
(3) the relay contacts from each of said programming channels being a mixture of normally open and normally closed contacts, said mixture being unique for each programming circuit,
(k) means for connecting said programming circuits to predetermined series circuits of said groups of input channels.

10. In an automatic component tester:
(a) a disc having a plurality of sectors, each sector containing a binary coded word the bits thereof extending radially of said disc, each bit of said binary coded word positioned within a discrete block on said disc,
(b) a source of light directed on said disc,
(c) a plurality of channels, each channel comprising:
(1) a sensing device responsive to the light reflected from said disc at a discrete block representing a single bit of a binary coded word for generating a signal in response to said bit,
(2) a relay coil,
(3) amplifying means connecting said sensing device to said relay coil for amplifying said signal and energizing said relay coil,
(4) a group of relay contacts for opening and closing electrical circuits in response to the energization of said relay coil,
(d) one of said channels being a synchronizing channel the relay contacts of which are normally open and which inhibit the operation of the automatic component tester until said normally open relay contacts are closed,
(e) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
(f) means for connecting circuits and components to be tested between said two groups of input channels,
(g) a potential source connected, through the relays of a second predetermined number of channels of said plurality of channels, in series with the series circuits of said first group of input channels.

11. In an automatic component tester:
(a) a disc having a plurality of sectors, each sector containing a binary coded word the bits thereof extending radially of said disc, each bit of said binary coded word positioned within a discrete block on said disc,
(b) a source of light directed on said disc,
(c) a plurality of channels, each channel comprising:
(1) a sensing device responsive to the light reflected from said disc at a discrete block representing a single bit of a binary coded word for generating a signal in response to said bit,
(2) a relay coil,
(3) amplifying means connecting said sensing device to said relay coil for amplifying said signal and energizing said relay coil,
(4) a group of relay contacts for opening and closing electrical circuits in response to the energization of said relay coil,
(d) one of said channels being a synchronizing channel the relay contacts of which are normally open and which inhibit the operation of the automatic component tester until said normally open relay contacts are closed,
(e) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels,
(f) means for connecting circuits and components to be tested between said two groups of input channels,
(g) a potential source connected, through the relays of a second predetermined number of channels of said plurality of channels, in series with the series circuits of said first group of input channels,
(h) a third predetermined number of channels of said plurality of channels the relay contacts of which selectively shunt series-connected precision resistors,
(i) means connecting said precision resistors in series with the series circuits of said second group of input channels,
(j) a fourth predetermined number of channels of said plurality of channels being programming channels,
(k) a plurality of programming circuits each comprising a series circuit including:
(1) relay contacts from each of said programming channels,
(2) relay contacts from said synchronizing channel,
(3) the relay contacts from each of said programming channels being a mixture of normally open and normally closed contacts, said mixture being unique for each programming circuit,
(l) means for connecting said programming circuits to predetermined series circuits of said groups of input channels.

12. In an automatic component tester:
(a) a disc having a plurality of sectors, each sector containing a binary coded word the bits thereof extending radially of said disc, each bit of said binary coded word positioned within a discrete block on said disc,
(b) a source of light directed on said disc,
(c) a plurality of channels, each channel comprising:
(1) a sensing device responsive to the light reflected from said disc at a discrete block representing a single bit of a binary coded word for generating a signal in response to said bit,
(2) a relay coil,
(3) amplifying means connecting said sensing device to said relay coil for amplifying said signal and energizing said relay coil,
(4) a group of relay contacts for opening and closing electrical circuits in response to the energization of said relay coil,
(d) one of said channels being a synchronizing channel the relay contacts of which are normally open and which inhibit the operation of the automatic component tester until said normally open relay contacts are closed,
(e) a predetermined number of said channels being input channels for receiving binary coded information provided to said component tester, said input channels being divided into first and second groups, the relay contacts of each channel within one group being arranged in a plurality of series circuits with the relay contacts of each of the other channels within said one group, to thereby provide a plurality of series circuits in each of said groups, each series circuit having relay contacts from all of the channels in that respective group of channels, (f) means for connecting circuits and components to be tested between said two groups of input channels, (g) a potential source connected, through the relays of a second predetermined number of channels of said plurality of channels, in series with the series circuits of said first group of input channels, (h) a third predetermined number of channels of said plurality of channels the relay contacts of which selectively shunt series-connected precision resistors, (i) means connecting said precision resistors in series with the series circuits of said second group of input channels, (j) a fourth predetermined number of channels of said plurality of channels being programming channels, (k) a plurality of programming circuits each comprising a series circuit including:
    (1) relay contacts from each of said programming channels,
    (2) relay contacts from said synchronizing channel,
    (3) the relay contacts from each of said programming channels being a mixture of normally open and normally closed contacts, said mixture being unique for each programming circuit, (l) means for connecting said programming circuits to predetermined series circuits of said groups of input channels, (m) amplifying means connected to said precision resistors, (n) detector means connected to said amplifying means for generating an indicator signal when the output of said amplifying means deviates beyond predetermined limits.

References Cited by the Examiner

UNITED STATES PATENTS

| | | | |
|---|---|---|---|
| 2,336,376 | 12/1943 | Tandler et al. | 317—130 X |
| 2,337,553 | 12/1943 | Hofgaard | 250—219 X |
| 2,796,534 | 6/1957 | Williams | 250—219 |
| 2,849,678 | 8/1958 | Hannon | 324—73 |
| 3,065,414 | 11/1962 | Sears et al. | 324—57 |

WALTER L. CARLSON, *Primary Examiner.*

A. E. RICHMOND, *Assistant Examiner.*